Aug. 9, 1938.  M. BALZ  2,126,085

MOTOR-DRIVEN VEHICLE

Filed April 10, 1936

Inventor

Max Balz

Attorney

Patented Aug. 9, 1938

2,126,085

UNITED STATES PATENT OFFICE 2,126,085

MOTOR-DRIVEN VEHICLE

Max Balz, Esslingen-on-the-Neckar, Germany, assignor to Daimler-Benz Aktiengesellschaft, Stuttgart-Unterturkheim, Germany Application April 10, 1936, Serial No. 73,605
In Germany April 15, 1935

21 Claims. (Cl. 267—20)

My invention relates to the chassis of a motor-driven vehicle and, more particularly, to an improved mounting of the wheels thereof.

The objects of my invention are to facilitate the assembly and disassembly of the front wheels to and from the frame of the chassis; to provide improved means for mounting the front wheels on the frame which are of simple and rugged construction and inexpensive in manufacture; to provide for a unitary structure which includes a front wheel, the means for suspending the same, the spring and a shock absorber and may be readily attached to and detached from the frame.

Further objects of my invention will appear from the description of a preferred embodiment following hereinafter and the features of novelty will be pointed out in the claims.

Figure 1:
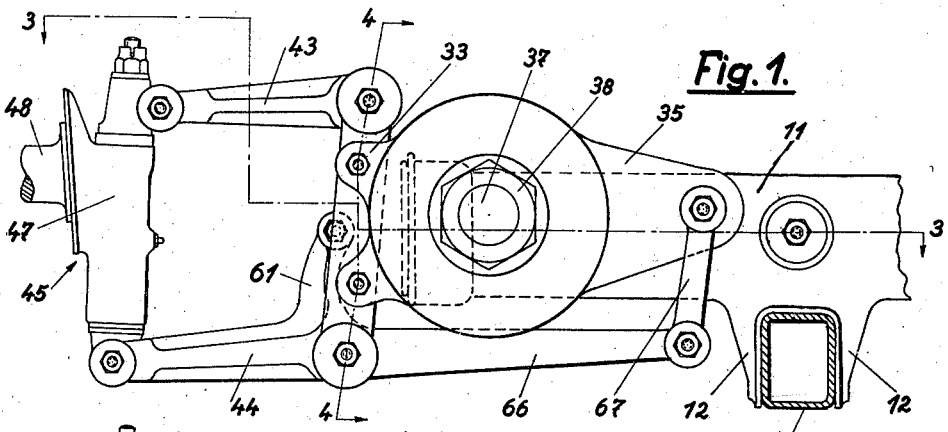
Fig. 1 is an elevation illustrating part of the frame, the carrier of a front wheel and my improved means for mounting the same on the frame.
Figure 4:
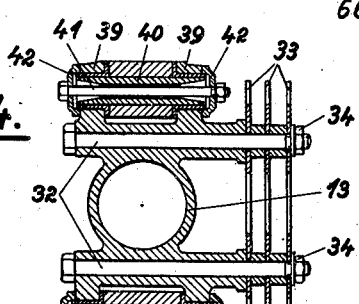

Fig. 4 a vertical section taken along line 4—4 of Fig. 1.

My invention is a further improvement of the subject matter of my application Serial Number 741,992 filed August 29, 1934.

In Fig. 1, the frame of the vehicle is but partly shown. Ths frame may be comprised of two longitudinal beams, one of which is indicated at 10, and of a number of transverse beams. One of these transverse beams at the front of the frame is of tubular form as shown at 11 and provided near each end with two spaced downward projections 12 straddling the longitudinal beam 10 and suitably connected thereto by means not shown in the drawing.

According to my invention, a support is attached to the frame which carries a front wheel, means for guiding the same in upward and downward direction, a shock absorber, a spring and a suitable linkage for connecting the spring and the shock absorber with the guiding means, the support and the elements carried thereby forming a unit which may be detached from the frame as a whole.

Preferably, the support projects into and is secured within the tubular transverse beam 11.

In the embodiment shown, the support is formed by a hollow cylindrical member 13 formed at its inner end with an eye 14 disposed in horizontal registry with diametrically opposed borings provided in the beam 11. These borings are surrounded by flanges 16 and 16' respectively. A pin 15 is firmly seated in the eye 14 and projects through the borings. A bolt 17 passes through a longitudinal boring of the pin 15. Its head 18 bears upon a cap 19 which, in its turn, bears upon an annular rubber cushion 20 seated within the annular flange 16 and a spacing sleeve 21 is slipped over the pin 15 and abuts against the eye 14 and the cap 19.

Similarly, a nut 22 on the threaded other end of the bolt 17 bears against a cap 23 which has a cylindrical threaded projection engaging inner threads of the hollow pin 15. A washer 24 is inserted between the cap 23 and an annular rubber cushion 25 seated within the flange 16'. A spacing sleeve 26 slipped over the pin is interposed between the eye 14 and the washer 24.

It will be noted that the cap 19 and the washer 24 are slightly spaced from the edges of the flanges 16 and 16'. Similarly, the inner edges of the opposed borings of the beam 11 are slightly spaced from the sleeves 21 and 26. Therefore, the pin 15 and the support 13 firmly attached to the pin are capable of a slight displacement relative to the tubular beam 11 in all of the three principal directions within the limits set by the elasticity of the cushions 20 and 25. The enlarged end 29 of the tubular beam 11 accommodates a bushing 30 provided with a spherical inner surface forming a seat for a rubber sleeve 31. This rubber sleeve surrounds closely the outer end of the cylindrical support 13. This structure combines simplicity and great strength with a limited resiliency which efficiently reduces the transfer of noise and vibration from the wheels to the frame.

The outer end of the support 13 projecting from the beam 11 is formed integral with a horizontal upper eye 27 and with a horizontal lower eye 28 accommodating two bolts 32 which serve for the attachment of the shock absorber.

Figure 3:
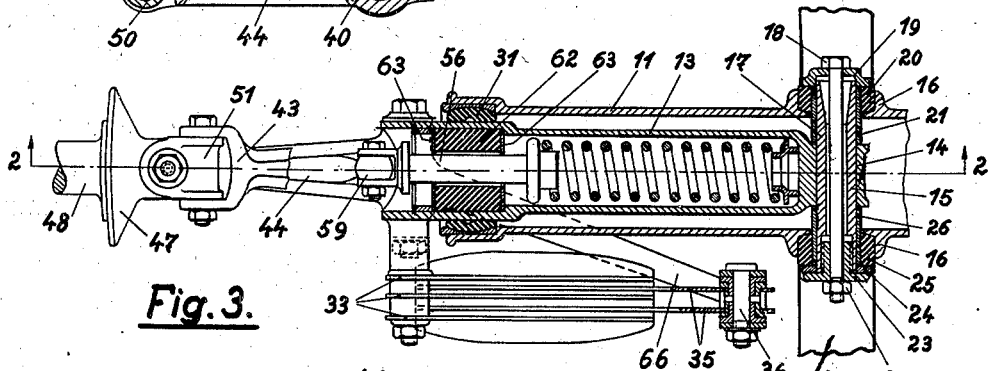
Fig. 3 is a plan-view, partly in section along line 3—3 of Fig. 1.

In the embodiment shown, the shock absorber consists of a relatively fixed part comprising discs 33 attached to the bolts 32 by spacing sleeves and nuts 34 and of a relatively movable part comprising discs 35, Fig. 3, attached to each other by a traversing bolt 36. The discs 35 extend between the discs 33 and are connected therewith by a centrally located transverse bolt 37. Plates of a suitable frictional material are sandwiched between the discs 35 and 33 and on the outside of the latter and are compressed by nuts 38 on the bolt 37. Hence, any relative pivotal motion of the discs 33 and 35 about the central bolt 37 will be resisted by the produced friction, whereby the shocks will be efficiently absorbed.

Each of the eyes 27 and 28 is formed with a pair of eyes 39 (Fig. 4) in which a horizontal pin 40 is inserted. This pin is hollow and traversed by a bolt 41 serving to keep two caps 42 in place which prevent a dislocation of the pin 40. Upon the two horizontal pins 40, there is pivotally mounted a pair of substantially parallel links 43 and 44 which extend towards the wheel carrier and are suitably hinged to the same.

The wheel carrier which is designated by 45 as a whole in Fig. 1, consists of a substantially vertical king bolt 46 and of a member 47 swingably mounted thereon. The member 47 is formed integral with a trunnion 48 on which the front wheel is journalled and with a steering arm (not shown) through which the member 47 may be turned on the king bolt 46. The lower end of the king bolt is formed with a head 49 which is straddled by the outer fork-shaped end of the link 44 and is pivotally connected thereto by a horizontal pivot pin 50. Similarly, a member 51 seated upon the tapered upper end of the king bolt 46 and held in place thereon by a nut 52 is pivotally connected to the fork-shaped end of the link 43 by a pin 53.

Figure 2:
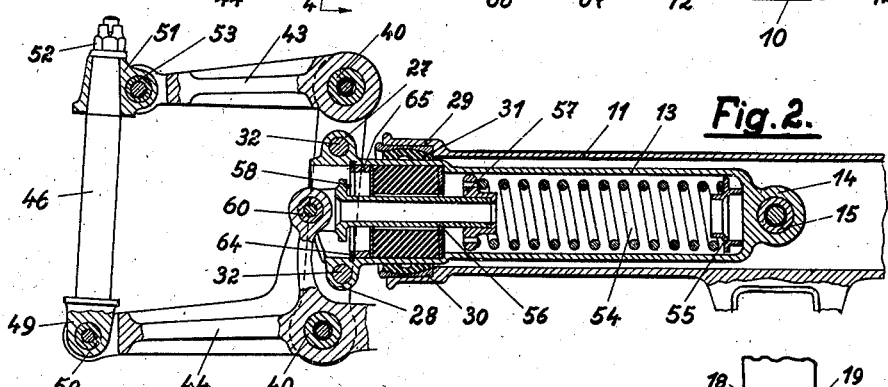
Fig. 2 is a vertical section taken along line 2—2 of Fig. 3.

The pair of links 43 and 44 serves to guide the wheel carrier 45 substantially vertically relative to the frame and the support 13 attached thereto. This relative motion is restrained by a helical spring 54 encased within the hollow support 13 and bearing upon a flanged annular supporting member 55, Fig. 2, positioned upon the bottom thereof. The outer end of the spring 54 bears against a shouldered stem 56 axially arranged within the hollow support 13, the shoulder 57 engaging the spring being formed by a flanged collar slipped over the inner end of the stem 56. The outer end of the stem 56 is provided with a shoulder 58 and with a fork-shaped end engaging over an eye 59 and pivoted thereto by a pin 60. The eye 59 is formed by the upper end of an arm 61 which projects upwardly from the link 44. Therefore, an upward motion of the wheel carrier 45 relative to the frame will result in a pivotal motion of the link 44 and of the arm 61 about the lower pin 40 and in an inward displacement of the shouldered stem 56 causing the helical spring 54 to be compressed.

A rubber cushion 62 provided within the hollow support 13 forms an abutment for the shoulders of the stem 56. This rubber cushion is sleeve-shaped surrounding the stem 56 and is confined between two annular plates 63. The inner plate 63 bears against an inner shoulder of the support 13, whereas the outer plate 63 is held in position by a split ring 64 engaging an inner peripheral groove of the cylindrical support 13 and by a spacer sleeve 65. It will be noted that the central boring of the cushion 62 has a larger diameter than the stem 56 so as to provide for a clearance permitting the cushion to be compressed when either the collar 57 or the shoulder 58 engages the adjacent plate 63. Owing to this alternative engagement, the relative motion of the wheel carrier 45 and the frame is resiliently limited.

The link 44 and the arm 61 form arms of a three-armed lever, the third arm 66 projecting inwardly and laterally, as shown in Figs. 1 and 3. Its inner end is connected to the pin 36 of the relatively movable part of the shock absorber by a link 67.

It will be apparent from the foregoing description that the support 13, the wheel carrier 45, the guiding means 43, 44, the shock absorber 33, 35, the spring 54 and the means 61 and 66 for operating the spring and the shock absorber constitute a unitary structure which may be detached from the frame as a whole. All that is necessary for this purpose is the removal of the pin 15. After this pin has been removed, the support 13 may be withdrawn from the tubular beam 11. The easy disassembly of this unit from the frame will greatly facilitate any repair of the unit and provides for an easy exchangeability of the entire wheel unit.

Furthermore, the forces set up by the cooperation of the wheel guiding means with the spring and the shock absorber will not be transmitted to the frame but will be taken up by the support 13 which carries both, the spring and the shock absorber.

While I have shown but one end of the tubular frame element 11, it will be understood that the other end is similarly designed, both front wheels being independently guided relative to the frame. The lateral mounting of the shock absorber on the outer end of the support 13 has the advantage that the shock absorber is easily accessible and that any shock absorber of standard construction may be used. It will be understood that while a shock absorber of the frictional type has been shown, any hydraulic shock absorber may be used equally well.

The word "frame" as herein used is not to be understood as limited to such device when formed separate from the body or coach work of the vehicle, but as including such device when forming a part of or intimately interconnected with said body or coach work of the vehicle.

The invention is not intended to be limited to the two forms shown, which are to be understood to be illustrative only and not as limiting, as various changes in construction may be made, all coming within the scope of the claims which follow.

What I claim is:

1. In a vehicle, the combination comprising a transverse tubular frame member, a relatively stationary support projecting into said frame member and adapted to be withdrawn therefrom, detachable means for securing said support in position within said frame member, a wheel carrier and a shock absorber connected to said support, and means for connecting and relatively guiding said wheel carrier and said support and for operating said shock absorber.

2. In a vehicle, the combination comprising a frame, a support, means for resiliently attaching said support thereto, a wheel carrier, a pair of substantially parallel links connected to and extending between said wheel carrier and said support for relatively guiding the same in up and down direction, a shock absorber comprising a relatively fixed part attached to said support and a relatively movable part, and means connecting one of said links with said movable part.

3. In a vehicle, the combination comprising a frame, a support mounted thereon, a shock absorber including a relatively fixed part attached to said support and a relatively movable part, a wheel carrier, a three-armed lever pivoted to said support having one arm linked to said relatively movable part of the shock absorber and having another arm pivoted to said wheel carrier, and a spring carried by said support and acting on said third arm.

4. In a vehicle, the combination comprising a frame, a relatively stationary hollow support, means for removably and resiliently attaching said support thereto, a wheel carrier, guiding means connected to said support and said wheel carrier for relatively guiding the same in up and down direction, a shock absorber mounted on said support for removal therewith from said frame, means connecting said shock absorber with said guiding means, and a spring encased within said hollow support and cooperating with said guiding means to restrain relative motion between said wheel carrier and said support.

5. In a vehicle, the combination comprising a transverse tubular frame member, a support projecting into said frame member and adapted to be withdrawn therefrom, a detachable bolt traversing said tubular frame member and said support to secure the latter in position within said frame member, a shock absorber mounted on said support, a wheel carrier, and means for connecting and relatively guiding said wheel carrier and said support and for operating said shock absorber.

6. In a vehicle, the combination comprising a transverse tubular frame member, a relatively stationary support projecting into said frame member and adapted to be withdrawn therefrom, detachable means for securing said support in position within said frame member, a spring and a shock absorber mounted on said support, a wheel carrier, and means for connecting and relatively guiding said wheel carrier and said support and for operating said shock absorber and said spring.

7. In a vehicle, the combination comprising a transverse tubular frame member, a relatively stationary support projecting into said frame member and adapted to be withdrawn therefrom, detachable means for securing said support in position within said frame member, a spring and a shock absorber mounted on said support, a wheel carrier, and a pair of links for connecting and relatively guiding said wheel carrier and said support and for operating said shock absorber and said spring.

8. In a vehicle, the combination comprising a transverse tubular frame member, a hollow support projecting into said frame member and adapted to be withdrawn therefrom, a detachable bolt traversing said tubular frame member and the inner end of said hollow support for securing the latter in position, a helical spring encased within said hollow support, a shock absorber including a relatively fixed part attached to said support and a relatively movable part, a wheel carrier, and a pair of substantially parallel links pivoted to and extending between said wheel carrier and said support for relatively guiding the same in up and down direction, one of said links being formed by one arm of a three-armed lever, the second arm of said lever being connected to said movable part of the shock absorber and the third arm of said lever being arranged to be acted upon by said spring.

9. In a vehicle, the combination with the frame of a unitary structure mounted on the frame and adapted to be detached therefrom as a whole, said structure comprising a relatively stationary support, means for resiliently attaching said support to said frame, a wheel carrier, guiding means connected to said support and said wheel carrier for relatively guiding the same in up and down direction, a shock absorber mounted on said support and means connecting said shock absorber with said guiding means.

10. In a vehicle having a frame, in combination, a wheel, a supporting member resiliently positioned on the frame, a pair of guiding arms each pivoted at one end to said supporting member for motion in a generally vertical plane, a wheel carrier connected to the other ends of each of said guiding arms and adapted to be rotated about a generally vertical axis, springing means by means of which the vertical motion of the guiding arm relative to the supporting member is opposed by a springing resistance, a shock absorber with a relatively stationary part which is connected with the supporting member, and a relatively movable part which is connected with one of the guiding arms, and means for detachably fastening the supporting member to the frame.

11. In a vehicle, in combination, a wheel, a wheel carrier, a frame member having a hollow portion at one end thereof, a supporting member positioned substantially within said hollow frame portion and partially projecting therefrom, guiding means for connecting the wheel carrier to the supporting member so that it can travel up and down relatively to the supporting member, spring means through which the up and down motion of the wheel carrier relative to the supporting member is opposed by a springing resistance, a shock absorber positioned outside of the hollow frame portion with a relatively stationary part which is fastened to that part of the supporting member which projects from the hollow frame member and a relatively movable part which is connected to one of the guiding arms, and means for detachably fastening the supporting member within the hollow frame member.

12. The combination according to claim 10 including elastic means independent of the spring means, which are inserted between the frame and the supporting member for supporting the same in a yieldable manner.

13. In a vehicle, the combination according to claim 11, in which the supporting member positioned within the hollow frame portion is formed in a hollow manner and a helical spring acting under compression serves as the springing means and is positioned within the hollow supporting member, said springing means abutting on one side against the supporting member and on the other side against one of the said guiding arms.

14. In a vehicle, the combination according to claim 11 in which the hollow frame member is positioned transversely to the direction of travel of the vehicle, and the guiding means connecting the wheel carrier to the supporting means are in the form of two links positioned one above the other and swinging in a plane transverse to the direction of travel of the vehicle, said supporting member being formed partially hollow, and a helical spring serving as a spring means is positioned within the hollow portion of said supporting member, said spring means operating under compression on one side against said supporting member and on the other side against one of the said guiding arms.

15. In a vehicle, the combination according to claim 11 in which that part of the supporting member projecting from the hollow frame member is formed as a cross piece positioned at right angles to the axis of the hollow frame member and on the ends of which are carried the guiding means in the form of arms positioned one above the other in the form of links, and whose middle portion between the attaching points of the link serves as a fastening for the relatively stationary parts of the shock absorber.

16. In a vehicle, in combination, a frame comprising a longitudinal member, and a transverse member embracing the same, a wheel, a wheel carrier, a supporting member attached to one end of the transverse member, guiding arms for the guiding of the wheel carrier by means of which the wheel carrier is connected to the supporting member in such a manner that it can travel up and down relatively to the supporting member, spring means through which the up and down movement of the wheel relative to the supporting member is opposed by a springing resistance, a shock absorber consisting of a relatively stationary part connected with the supporting member and a relatively movable part connected to the wheel carrier and positioned adjacent the projecting part of the transverse member, and means for detachably fastening the supporting member to the frame.

17. The combination according to claim 16 in which the end of the transverse member extending over the longitudinal member is made hollow, and the supporting member is positioned within the same and partially projects therefrom, the relatively stationary part of the shock absorber being attached to the projecting part of said supporting member.

18. In a vehicle having a frame, in combination, a support, means for resiliently attaching said support to said frame, wheel supporting means, a four link quadrilateral one pair of opposite arms of which are connected to said wheel supporting means and said support respectively, a shock absorber having relatively movable parts, one of said parts being connected to said support and the other to one of the arms of said link quadrilateral.

19. The combination according to claim 18 in which said shock absorber includes a plurality of relatively stationary disks and a plurality of relatively movable disks, and frictional material placed therebetween.

20. In a vehicle, the combination according to claim 1, in combination with means for elastically mounting said stationary support within said transverse tubular frame member.

21. In a vehicle, a frame, a supporting member, means for elastically mounting said supporting member on the frame, a wheel carrier, means for pivotally connecting said wheel carrier to said supporting member for upward and downward movement relative to the frame, comprising a pair of arms positioned one above the other and forming a link parallelogram with said wheel carrier and supporting member, spring means connected to resist the up and down motion of the wheel carrier, and a shock absorber having two relatively movable dampening elements, one of which is attached to the supporting member and the other of which is attached to an upwardly and downwardly moving member of the link parallelogram.

MAX BALZ.